April 28, 1970  A. BENDE ETAL  3,509,308
SELF-TILTING EQUALIZING WELDING GUN
Filed July 26, 1967  2 Sheets-Sheet 1

INVENTORS
ALBERT BENDE
VINCENT A. KAITZ
BY
ATTORNEY

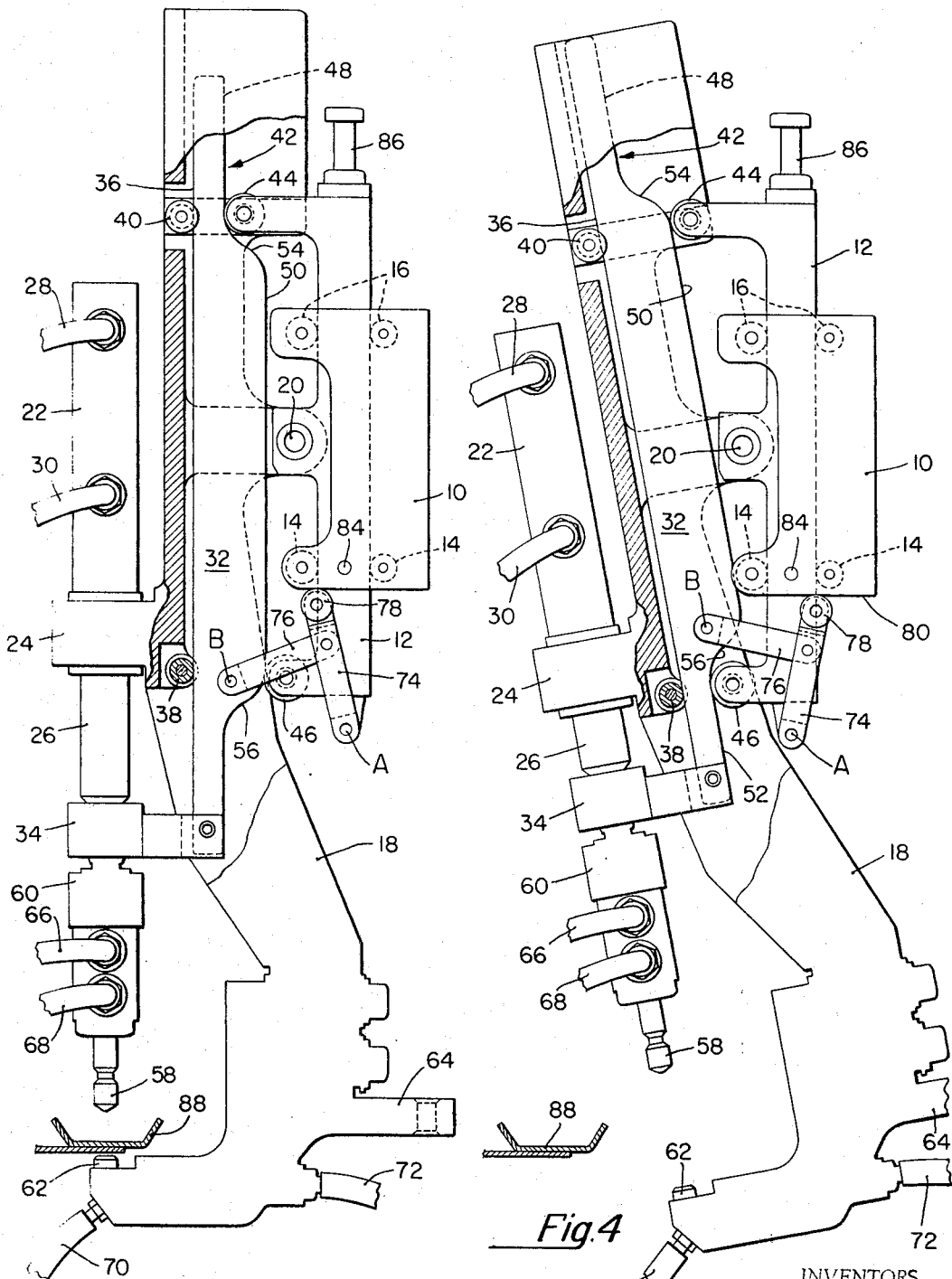

United States Patent Office 3,509,308
Patented Apr. 28, 1970

---

3,509,308
SELF-TILTING EQUALIZING WELDING GUN
Albert Bende, Haddon Heights, N.J., and Vincent A. Kaitz, Willow Grove, Pa., assignors to The Budd Company, Philadelphia, Pa., a corporation of Pennsylvania
Filed July 26, 1967, Ser. No. 656,287
Int. Cl. B23k 9/28
U.S. Cl. 219—89
4 Claims

ABSTRACT OF THE DISCLOSURE

A welding gun and supporting structure having cams, followers and linkages for moving the welding gun between a stored position and a welding position and stop means restricting movement of one electrode until in the welding position and then permitting the welding tips to equalize on the object to be welded during the weld cycle. The fluid pressure actuating means for moving the electrode and applying pressure during the weld cycle is also utilized as the power source for moving the welding gun between the stored position and the welding position.

---

This welding gun is a modification of copending application "Tilting Welding Gun," Ser. No. 601,958, filed Dec. 15, 1966.

This invention relates to hydraulically actuated spot welding guns and more particularly to a welding gun that utilizes a fluid pressure system for moving the welding gun between a stored position and a welding position, and for applying pressure to the electrodes during the welding process. The improvement over the prior art comprises the unique feature of full equalization of the welding tips during the welding cycle so that the object to be welded will not be unduly damaged due to movement of one electrode toward the other fixed electrode. Positive control over the welding gun is required during movement between the stored position and the welding position, but once the electrode begins to approach opposite sides of the object to be welded, the ability of the welding head to move one electrode a greater distance than the other to accommodate the object to be welded becomes necessary to prevent damage to the welded object.

Another advantage of a full equalizing welding gun, is the ability of the gun to self-adjustment after tip dressing or because of tip wear. Thus, continuous readjustment of the weld stroke after wear of the electrodes or electrode tip dressing is not necessary.

An object of this invention is to provide a fluid pressure actuated welding gun in which the power cylinder for actuating the welding gun is used to supply the actuating force to sequentially move the welding gun from a stored or tilted position into a welding position by the aid of compatible cycloidal cams and conjugate cam followers, move the electrodes into contact with the object to be welded, permitting full equalization of the electrodes during the welding movements, and return the welding gun to the stored position after the welding cycle is completed.

This and other objects of this invention will become apparent as reference is made to the following specification and drawings wherein:

FIG. 3 is a side view of the novel welding gun in vertical position and the electrodes open, with sections broken away to illustrate the control linkage.

FIG. 4 is a side view of the novel welding gun in the stored or tilted position with section broken away to show the position of the control linkage and cam bar.

For purposes of explanation, the longitudinal axis of the welding gun is to be considered in a vertical position with the electrodes and work piece being referred to as being at the bottom of the welding gun.

Figure 2:
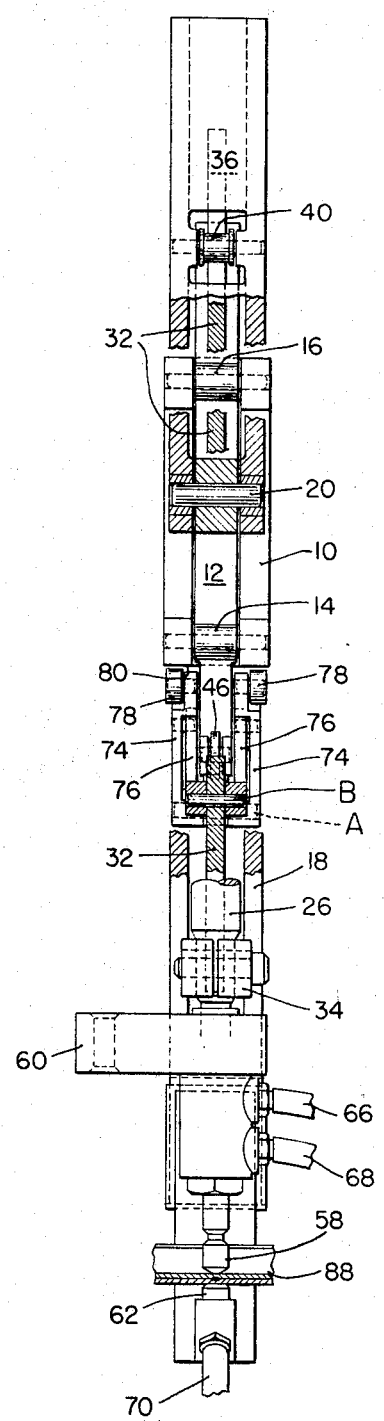
FIG. 2 is a front view of the welding gun with sections broken away to show pivotal connection between the actuating cam and the control links.
Figure 1:
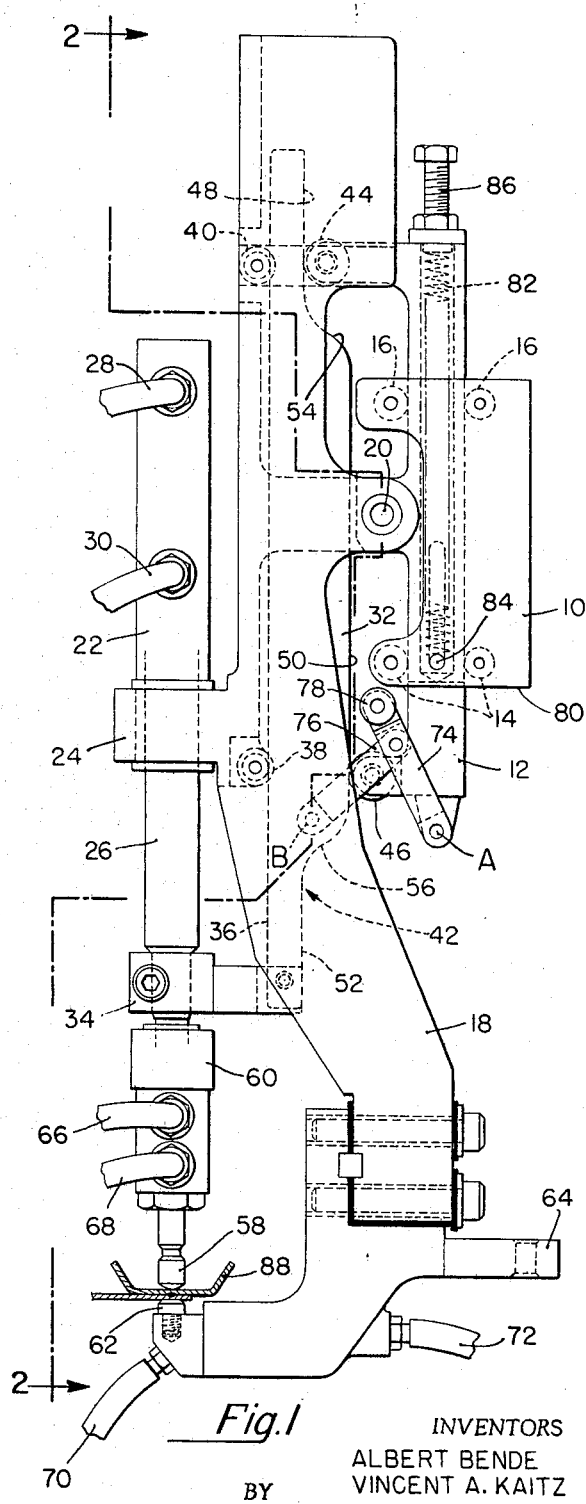
FIG. 1 is a side view of the welding gun of the present invention in welding position and illustrating the actuating cam and control linkages.

Referring now to the drawings, as best seen in FIGS. 1 and 2, a mounting bracket 10 is secured to a fixed support such as a wall. A guide bar 12 is slidably mounted in the mounting bracket 10 with pairs of rollers 14, 16 rotatably secured in the mounting bracket and in contact with the guide bar 12 for providing easy movement of the guide bar relative to the mounting bracket.

The welding gun support frame or yoke 18 is pivotally secured to the guide bar 12 by a pivot pin 20 for pivotal movement relative to the guide bar 12 and mounting bracket 10.

A conventional double acting fluid pressure actuated drive cylinder 22 is secured to the yoke 18 by a clamp bracket 24 for movement therewith. A drive rod 26 extends from the drive cylinder 22 and is connected to a piston (not shown) within the drive cylinder for reciprocal movement therewith. A pair of fluid connections 28, 30 connect a source of fluid under pressure to opposite sides of the piston within the drive cylinder 22 for application of fluid under pressure to one of the sides of the piston upon command whereby the piston is moved within the cylinder and drives the drive rod 26 in reciprocal movements relative to the drive cylinder 22 in a conventional manner.

A cam bar 32 is secured to the drive rod 26 by clamp 34 for movement therewith. The cam bar 32 is positioned within the yoke 18, with one plane surface 36 contacting a pair of rollers 38, 40 journaled in the yoke, for reciprocating parallel movement relative to the yoke. A cam surface 42 is formed on cam bar 32 opposite surface 36 and is in contact with a pair of oscillating conjugate cam follower rollers 44, 46 journaled in the guide bar 12.

The cam surface 42 includes three surfaces 48, 50 and 52 that are parallel to each other and to surface 36. Surfaces 48 and 52 are in the same plane and equidistance from surface 36. Surface 50 is connected to surfaces 48 and 52 by conjugate cam ramps 54, 56, respectively. The cam ramps 54, 56 are formed as cycloidal cams of compatible but opposite slope and are positioned so that roller 46 will be contacting ramp 56 at all times that roller 44 is contacting ramp 54. Such cycloidal cam surfaces provide a sinusoidal acceleration curve for the cam system. Further, when roller 44 is in contact with surface 48, roller 46 will be in contact with surface 50 and when roller 46 is in contact with surface 52, roller 44 will be in contact with surface 50.

The welding gun consists of an upper electrode 58 connected to the drive rod 26 for movement therewith and having an arm 60 extend therefrom for connection to an electrical energy source. A lower electrode 62 is secured to the yoke 18 for movement therewith and includes an arm 64 extending therefrom for connection to the source of electrical energy. Each electrode is water cooled in the conventional manner by water lines 66, 68 connected to the upper electrode 58 and water lines 70, 72 connected to the lower electrode 62. The electrodes 58, 62 are electrically insulated from the supporting structure by conventional means.

The novel feature of this tilting welding gun is the full equalizing feature of the electrodes during the welding cycle. A pair of control links 74, 76 interconnect the cam bar 32 and the guide bar 12 for controlling movement of the yoke 18 between the stored position shown in FIG. 4 and the welding position shown in FIG. 3 by acting as a stop means for limiting linear movement of the yoke until the welding gun is in welding position. Parallel links are used for links 74, 76 for strength and identical numbers will be used to identify the adjacent parallel links.

The cam link 74 has one end pivotally connected to the lower end of the guide bar 12 at pivot point A. The other end of link 74 has a roller 78 pivotally secured thereto for rolling contact with the lower surface 80 of the mounting bracket 10.

The drive link 76 has one end pivotally connected to cam link 74 intermediate the ends thereof. The other end of drive link 76 is pivotally connected to the cam bar 32 at pivot point B.

A balance spring 82 is located in the guide bar 12 and has one end bearing against pin 84 secured in the support bracket 10 and the other end bears against an adjustment bolt 86 threadably connected to the guide bar 12 for adjusting the effective force of the spring 82. In this manner the spring 82 resiliently supports the guide bar and yoke on support bracket 10 when roller 78 is not in contact with surface 80. The biasing force of spring 82 is adjusted by the adjustment bolt 86 for supporting the apparatus so that the upper electrode just contacts the work piece 88.

In operation, with the welding gun in the stored position, as seen in FIG. 4, fluid pressure is supplied to the drive cylinder 22 through supply port 28 exerting a downward pressure on the piston and thereby moving the drive rod 26 away from the cylinder 22. The cam bar 32 moves with the drive rod on rollers 38, 40 contacting surface 36 and rollers 44, 46 moving over surfaces 50 and 52, respectively to the respective ramps 54, 56. As the roller 44 moves on ramp 54 from surface 50 to surface 48 and roller 46 moves on ramp 56 from surface 52 to surface 50, the yoke 18 is pivoted about pivot pin 20 to a vertical position as seen in FIG. 3. During such pivotal movement of the yoke 18, roller 78 moves over surface 80 and cam link 74 pivots counter clockwise about pivot point A to the position shown in FIG. 3. Further downward movement of the drive rod 26 moves the upper electrode 58 toward the work piece or object to be welded 88 as the rollers 44, 46 move on the respective surfaces 48, 50 of the cam bar 32. The downward movement of cam bar 32 causes drive link 76 to pivot counter clockwise about pivot point B and clockwise about pivotal connection to cam link 74 as the cam link pivots counter clockwise about pivot point A. As the upper electrode 58 reaches the work piece 88 as seen in FIG. 1, the roller 78 is moved clear of surface 80 by the counter clockwise movement of cam link 74. The balance spring 86 then resiliently supports the entire apparatus on the pin 84 in the mounting bracket 10 and continued application of fluid pressure through port 28 causes the electrodes 58 and 62 to equalize on the work piece 88 and complete the welding cycle in a conventional manner.

After the welding operation, the fluid pressure applied through port 28 to the piston is stopped and the fluid pressure is applied to the opposite side of the piston through port 30 causing the drive rod 26 and cam bar 32 to move upwardly. Moving the cam bar upwardly moves roller 44 down surface 48 and up ram 54 as roller 46 moves down surface 50 and down ramp 56 thereby tilting the apparatus to stored position as seen in FIG. 4. Such upward movement of the cam bar 32 pivots drive link 76 clockwise about pivot point B and causes clockwise movement of cam link 74 about point A with the roller 78 moving back over surface 80 of the mounting bracket 10. The roller 78 moves over surface 80 clockwise about pivot point A as the yoke and welding apparatus is tilted about pivot pin 20 to the stored position as seen in FIG. 4.

Various degrees of tilt between the stored position and the welding position may be obtained by adjustment of the follower rollers and the cam ramps.

While but one embodiment of this invention is described and illustrated, it is not intended to be limited by such arrangement but by the prior art and the scope of the following claims.

We claim:

1. A welding gun having a welding position and a stored position and being movable therebetween, said gun including mounting means for supporting said gun on a fixed support, a support bracket movably supported on said mounting means, a yoke pivotally supported on said support bracket for pivotal movement between said stored position and said welding position, actuating means operably connected to and supported on said yoke for moving said yoke between said positions, cam means operably interconnecting said actuating means and said yoke for controlling movement of said yoke between said positions, a first welding electrode secured to said yoke for movement therewith, a second welding electrode secured to said cam means and in alignment with said first electrode for movement theretoward by said actuating means, said second electrode being moved toward said first electrode during movement of said welding gun from said stored position to said welding position, stop means restricting linear movement of said first electrode toward said second electrode until said welding gun is in welding position, a source of electrical energy operably connected to said electrodes, and control means for controlling said actuating means and electrical energy supplied to said electrodes for effectively welding a workpiece between said electrodes when said welding gun is in welding position.

2. The welding gun as claimed in claim 1 wherein said stop means includes a first lever having one end pivotally connected to said support bracket and a second end contacting said mounting bracket in said stored position and during movement between said positions for restricting movement of said support bracket until said welding gun is in said welding position.

3. The welding gun as claimed in claim 2 wherein said stop means includes a second lever having a one end pivotally connected to said first lever intermediate the ends thereof and the other end pivotally connected to said cam means for movement therewith whereby linear movement of said cam means by said actuating means moves the second lever therewith and pivots said first lever about said one end of said first lever and moves said second end from contact with said mounting bracket for permitting equalizing movement of said electrodes on a work piece positioned between said electrodes.

4. The welding gun as claimed in claim 3 including a biasing means normally biasing said first electrode toward said second electrode and being effectively blocked from such biasing by said stop means when said welding gun is moved from said welding position.

References Cited

UNITED STATES PATENTS 3,008,034  11/1961  Wolfbauer _____ 219—89
3,299,247  1/1967   Waltonen _____ 219—89

JOSEPH V. TRUHE, Primary Examiner

J. G. SMITH, Assistant Examiner